United States Patent

Scott et al.

[11] Patent Number: 5,605,551
[45] Date of Patent: Feb. 25, 1997

[54] PROCESS FOR THE THERMAL CONVERSION OF BIOMASS TO LIQUIDS

[75] Inventors: Donald S. Scott; Jan Piskorz; Desmond Radlein; Piotr Majerski, all of Waterloo, Canada

[73] Assignee: University of Waterloo, Waterloo, Canada

[21] Appl. No.: 446,789

[22] PCT Filed: Nov. 24, 1993

[86] PCT No.: PCT/CA93/00504

§ 371 Date: Jul. 31, 1995

§ 102(e) Date: Jul. 31, 1995

[87] PCT Pub. No.: WO94/12592

PCT Pub. Date: Jun. 9, 1994

[30] Foreign Application Priority Data

Nov. 26, 1992 [GB] United Kingdom ............ 9224783

[51] Int. Cl.⁶ .................... C10L 1/02; C10G 1/02
[52] U.S. Cl. ................... 44/307; 44/606; 44/628; 48/197 R; 201/2.5; 201/28; 201/29; 201/36; 201/37
[58] Field of Search ............ 44/307, 606, 628; 48/197 R; 20/2.5, 28, 29, 36, 37

[56] References Cited

U.S. PATENT DOCUMENTS

| | | | |
|---|---|---|---|
| 1,395,867 | 11/1921 | Pearce | 44/606 |
| 3,852,048 | 12/1974 | Pyle | 44/606 |
| 4,329,202 | 5/1982 | White et al. | 44/606 |
| 4,344,770 | 8/1982 | Capener et al. | 44/307 |
| 4,530,700 | 7/1985 | Sawyer et al. | 44/606 |
| 4,564,368 | 1/1986 | Sawyer et al. | 44/606 |
| 4,876,108 | 10/1989 | Underwood et al. | 426/650 |
| 4,994,297 | 2/1991 | Underwood et al. | 426/650 |

FOREIGN PATENT DOCUMENTS

| | | |
|---|---|---|
| 1241541 | 9/1988 | Canada. |
| 81/01713 | 6/1981 | WIPO. |

*Primary Examiner*—Margaret Medley
*Attorney, Agent, or Firm*—Sim & McBurney

[57] ABSTRACT

A high conversion of biomass, such as wood, sawdust, bark, or agricultural wastes, to liquids is obtained by pyrolysis at short reaction times in a reactor capable of high heat transfer rates; the reactor being of the fluidized bed, circulating fluidized bed or transport type in which the conveying gas contains low and carefully controlled amounts of oxygen, allowing a reaction system with low concentrations of carbon monoxide or flammable gases with a resulting improvement in operating safety and potential improvement in thermal efficiency and capital costs. The oxidation steps may be carried out in one or two stages. The resulting liquid product may be used as an alternative liquid fuel or as a source of high-value chemicals.

9 Claims, 2 Drawing Sheets

PROCESS FOR THE THERMAL CONVERSION OF BIOMASS TO LIQUIDS

FIELD OF INVENTION

This invention discloses an improvement on present methods of thermal conversion of biomass to liquids which eliminates safety problems present in the current practice due to high concentrations of carbon monoxide and the handling of large volumes of explosive gases at high temperatures. At the same time, potential savings in energy efficiency are made possible.

BACKGROUND TO THE INVENTION

Current practice in obtaining high liquid yields from the thermal decomposition of biomass at short reaction times (sometimes called "fast", "flash" or "rapid" pyrolysis) makes use of reactor types capable of high heat transfer rates to small biomass particles, in order to achieve the rapid heat-up rates necessary. Three of the most commonly used types are the fluidized bed, the circulating fluidized bed or the transport reactor. In the first two of these, hot gases and solids, normally inert, are brought into intimate contact with the biomass particles. In transport reactors, either hot gas alone or a mixture of hot gas and solids may be used. All of these reactors have in common a requirement for a significant gas flow, usually from 1 to 10 times the weight of biomass being processed. If pyrolysis is carried out in the absence of oxygen, then the non-condensable gases formed will have significant contents of carbon monoxide, hydrogen, methane, and other light hydrocarbons or organics, and are of medium calorific value and can be readily burned in air.

In order to preserve the high calorific value of these non-condensable gases, and to prevent the loss of organic liquid yield due to uncontrolled oxidation reactions if air is present, it is current practice to use these gases as a recycle stream to supply the necessary fluidizing or conveying gas for reactor operation. It is also current practice to heat this recycle stream indirectly in order to supply part or all of the heat necessary for the pyrolysis reaction.

The operation of a fluidized bed process has been described by Scott and Piskorz (1) (2). When poplar wood was used as feed in a fluidized bed of sand at a temperature of 500° C. and a gas apparent residence time of 0.48 seconds at a gas to-feed weight ratio of 3:1, the recycle gas composition, on a moisture-free basis, was:

| Hydrogen | 1.49% | by volume |
|---|---|---|
| Carbon monoxide | 47.83% | |
| Carbon dioxide | 39.40% | |
| Methane | 6.97% | |
| Ethylene, ethane, etc. | 4.31% | |

The yield of gas was 11.1%, of organic liquid 66.3%, and char 11.8%, expressed as weight % of the moisture-free feed. The balance of 10.8% was water formed in the pyrolysis reactions.

It is apparent that a gas with such a high concentration of carbon monoxide would be extremely toxic, and even small leakages or emissions would pose a severe hazard to life. In addition, the gas can readily form explosive mixtures with air due not only to the carbon monoxide content but also due to the content of other inflammable hydrocarbons and hydrogen. However, in the prior art as described in these publications and also in our earlier Canadian Patent No. 1,241,541 (September, 1988), it is specified that the gas used must be oxygen-free.

Pyrolysis with a transport reactor in which both gas and hot solids were mixed and transported with the biomass is described by Graham et al (3). Poplar wood was pyrolysed at 650° C. and 0.524 seconds apparent residence time. Although gas recycle was not used in the reported experiments (nitrogen was used), if gas recycle had been practised as would be expected in a larger scale unit, then, on an inerts-free basis, this reactor would give a gas for the above conditions having the following analysis:

| Hydrogen | 4.18% | by volume |
|---|---|---|
| Carbon monoxide | 63.10% | |
| Carbon dioxide | 11.80% | |
| Methane | 12.55% | |
| Ethylene, ethane etc. | 8.37% | |

Clearly, a gas of this composition would be hazardous in practice, being both highly toxic and readily forming explosive mixtures with air. In this work, the carrier gas used was inert. In subsequent disclosures by Underwood and Graham (U.S. Pat. No. 4,876,108, Oct. 24, 1989 and U.S. Pat. No. 4,994,297, Feb. 19, 1991), three reactor systems were described for the preparation of fast pyrolysis liquids from wood or cellulose (4). In every example, and in all claims, it is specified that the process is to be carried out in the absence of oxygen. For the RTP unit described, it is specified that inert gas is to be used together with suspended particulate solids.

It is highly desirable to make use of the combustible non-condensable gases produced during pyrolysis in order to recover their heating value and thereby improve the thermal efficiency of the process. If this is done by use of a recycle stream of product gas after venting the pyrolysis product gas for use as a fuel supplement, then significantly large amounts of such gases must be cooled and heated to fulfill their function as carrier or fluidizing gases for the reactor used. Given the highly toxic and explosive nature of this recycle gas stream, it will be necessary in practice to build into the process extensive alarm systems, and emergency ventilation and fire prevention equipment at considerable capital cost. A high degree of automation may be found to be required. Environmental considerations may add additional capital and operating costs. It is particularly difficult to prevent escape of some process gas at the point where biomass particles, must be fed to the system. Even if lock hopper feeders or other positive devices are used, an extensive purging capability must be installed.

SUMMARY OF INVENTION

We have discovered that pyrolysis of biomass in the type of reactors described can be carried out with little loss of yield of liquid or of the desirable high-value chemicals produced, by use of a carefully controlled oxidizing atmosphere. The recycle gas produced is low in carbon monoxide and is not combustible or flammable in air. All the non-condensable combustible components are utilized efficiently to provide a part of the required process heat. In previous processes in which partial combustion was used, as was the traditional practise in classical destructive distillation of wood, or even in current practises for the preparation of charcoal in fluidized or moving bed reactors, yields of organic liquids are low, typically less than 35% as compared to yields of 50% to 70% in non-oxidizing processes. For example, the company literature describing the fluidized bed partial oxidation process of BIO-Alternative SA for the preparation of solid, liquid and gaseous fuels by the "combustion of carefully dosed pyrolysis gas" reports typical yields from waste wood as 43 to 53% charcoal, 15 to 25% oil, and 18 to 25% gas (5).

In our preferred method as described below, oxidation is used to destroy carbon monoxide and other toxic or flammable gases while still achieving liquid yields comparable to non-oxidizing pyrolysis processes, and recovering the heat content of these gases. As a result, a pyrolysis gas which is of low toxicity and which is not capable of forming explosive mixtures is produced for use as a conveying or fluidizing gas.

More significantly in our preferred embodiment of the pyrolysis process, the yields of high value chemicals are affected to only a minor degree. In particular, the yield of hydroxyacetaldehyde, one of the most abundant of these compounds, is reduced by only a small amount, less than 10% in a properly operated process. It was not known in the previous art that this was possible, while still carrying out a pyrolysis in an oxidizing atmosphere.

Accordingly, in this invention there is provided a process for the conversion by thermal means at short reaction times of lignocellulosic materials (biomass), or products derived from biomass which contain cellulose, hemicellulose and lignin fractions as major components in widely variable amounts, to produce a high yield of organic liquid products; the process being carried out under conditions which oxidize selectively combustible non-condensable gases generated in the pyrolysis while oxidizing only a minor portion of other organic products, with the result that the large amount of recycle gas used in the process for conveying or fluidization is of low toxicity compared to that used in non-oxidizing processes, and is not capable of forming explosive mixtures with air.

The process defining our invention comprises the following steps.

(a) adding sufficient air to the stream of recycle process gas to be used for conveying or fluidization to provide an excess of oxygen of 0% to about 200% of that required for combustion of combustible gas components, such as carbon monoxide, hydrogen, methane, ethane, ethylene, and other light hydrocarbons or volatile organic compounds;

(b) passing the resulting air-recycle gas mixture through a conventional catalytic converter to oxidize the carbon monoxide and other gases in the recycle process gas. Some preheating of this gas could be done if necessary to make the oxidation step more efficient;

(c) reheating the oxidized recycle gas together with any excess oxygen to a sufficiently high temperature to supply the required heat to a pyrolysis reaction;

(d) subjecting a biomass feed after grinding to small particles (e.g. sawdust) and drying to less than to about 10% moisture content to short residence time pyrolysis within the conditions of temperature about 400° C. to about 650° C., gas and volatiles residence time of about 2 seconds or less and substantially atmospheric pressure to form a product gas;

(e) condensing from the product gases an organic liquid product together with a majority of the water after removal of char or unreacted solids; and (f) recycling the non-condensable gases and inerts to step (a).

GENERAL DESCRIPTION OF INVENTION

A pyrolysis reactor is operated generally at the conditions we have described in our earlier publications and patent, that is, at conditions optimal for maximum yield of organic liquid, a temperature from about 400° C. to about 650° C., an apparent vapor residence time of less than about 2 seconds and at substantially atmospheric pressure. An amount of air is added to the recycle gas stream which is from 0% to about 200% in excess of that required to stoichiometrically completely oxidize the non-condensable components of the recycle gas stream. A preferred amount is from about 0% to about 100% excess air. The recycle gas in the steady state is very dilute with respect to carbon monoxide or other combustibles. A flow sheet showing the mass balance which is achieved in the present invention is given in FIG. 1, based on a conceptual plant with 100 kg per unit time of dry poplar sawdust feed, containing 6% moisture, and operation at optimal conditions of temperature and residence time, but with 30% excess air added in excess of the requirements for combustion of components in the recycle stream. The recycle gas available for use in the process for fluidizing or conveying after condensing out the organic liquids and a majority of the water formed, for this example, has a composition as given below,

| | | |
|---|---|---|
| Hydrogen | 0.04% | by volume |
| carbon monoxide | 1.44% | |
| Carbon dioxide | 29.87% | |
| Nitrogen | 68.25% | |
| Methane, other hydrocarbons | 0.40% | |

Figure 1:
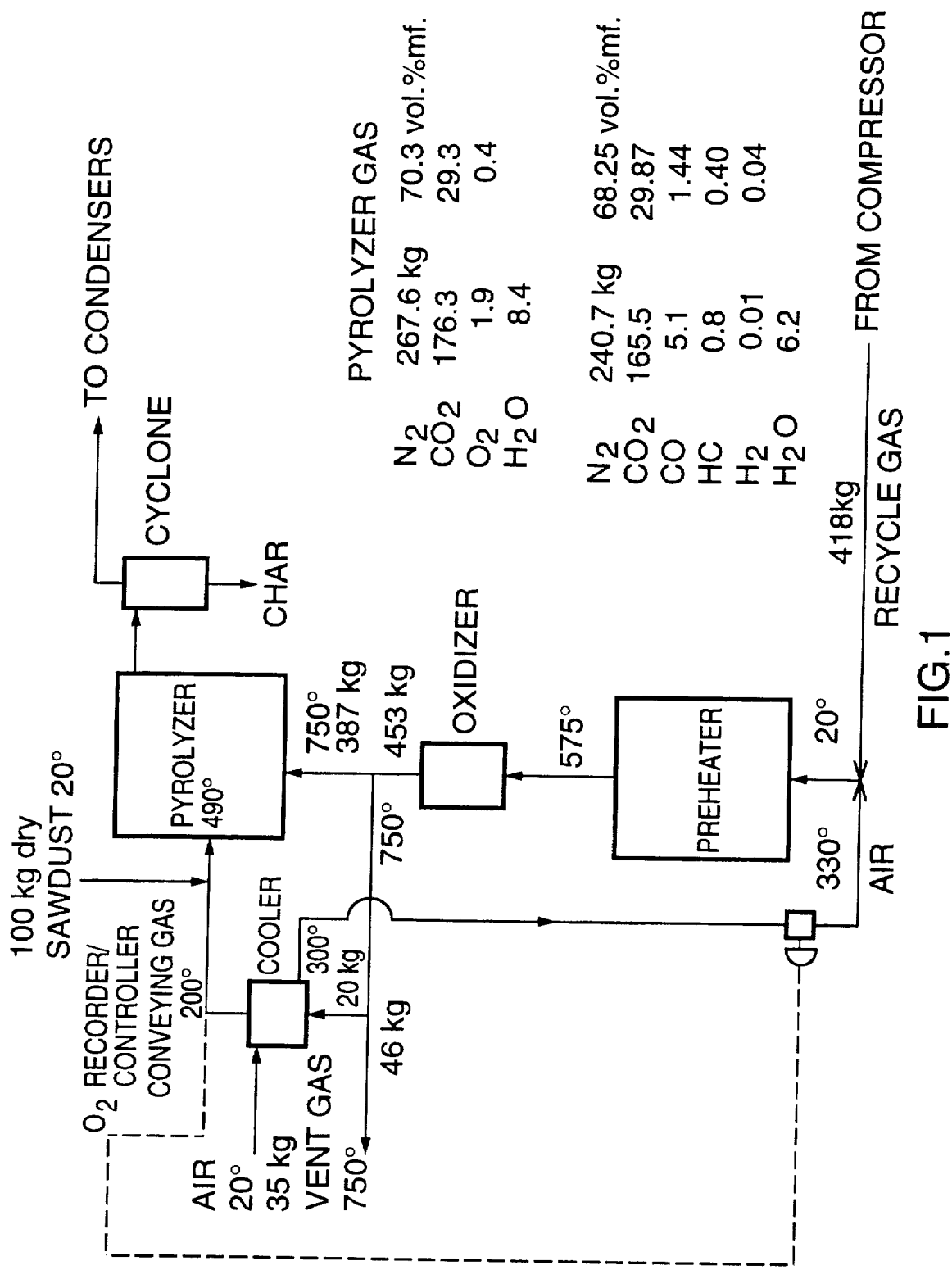
FIG. 1 is a schematic flow sheet of one embodiment of the process of the invention. A detailed mass balance is provided for gas flows utilizing the process of this invention, on the basis of a unit of 100 dry kg of poplar sawdust feed, with a recycle gas/sawdust weight ratio of 4:1, to a pyrolyzer operating at 490° C. Gas yield and composition are based on a volatiles residence time of 0.48 seconds in the pyrolyzer. Sufficient air is added to the recycle gas stream as shown to represent 130% of the stoichiometric requirement to oxidize completely the carbon monoxide, methane, and other non-condensable hydrocarbon gases and volatile organic vapours. Complete oxidation is assumed to occur in the oxidizer. The unreacted oxygen added in the air in excess of this stoichiometric requirement (30%) is assumed to react with the sawdust in the pyrolyzer to form water and carbon dioxide or carbon monoxide (in a 4:1 ratio). Temperatures given are obtained from energy balances on the pyrolysis system. A catalytic oxidation unit has been assumed, using a platinum catalyst, and operating at 575°–750° C.

It is apparent that this gas has a low level of toxicity, and is not capable of forming explosive mixtures with air. Further, as shown in FIG. 1, a side stream containing no carbon monoxide can be taken after cooling for pneumatic conveying of the feed or for purging of the feed system, to give a completely non-toxic feed system.

Figure 2:
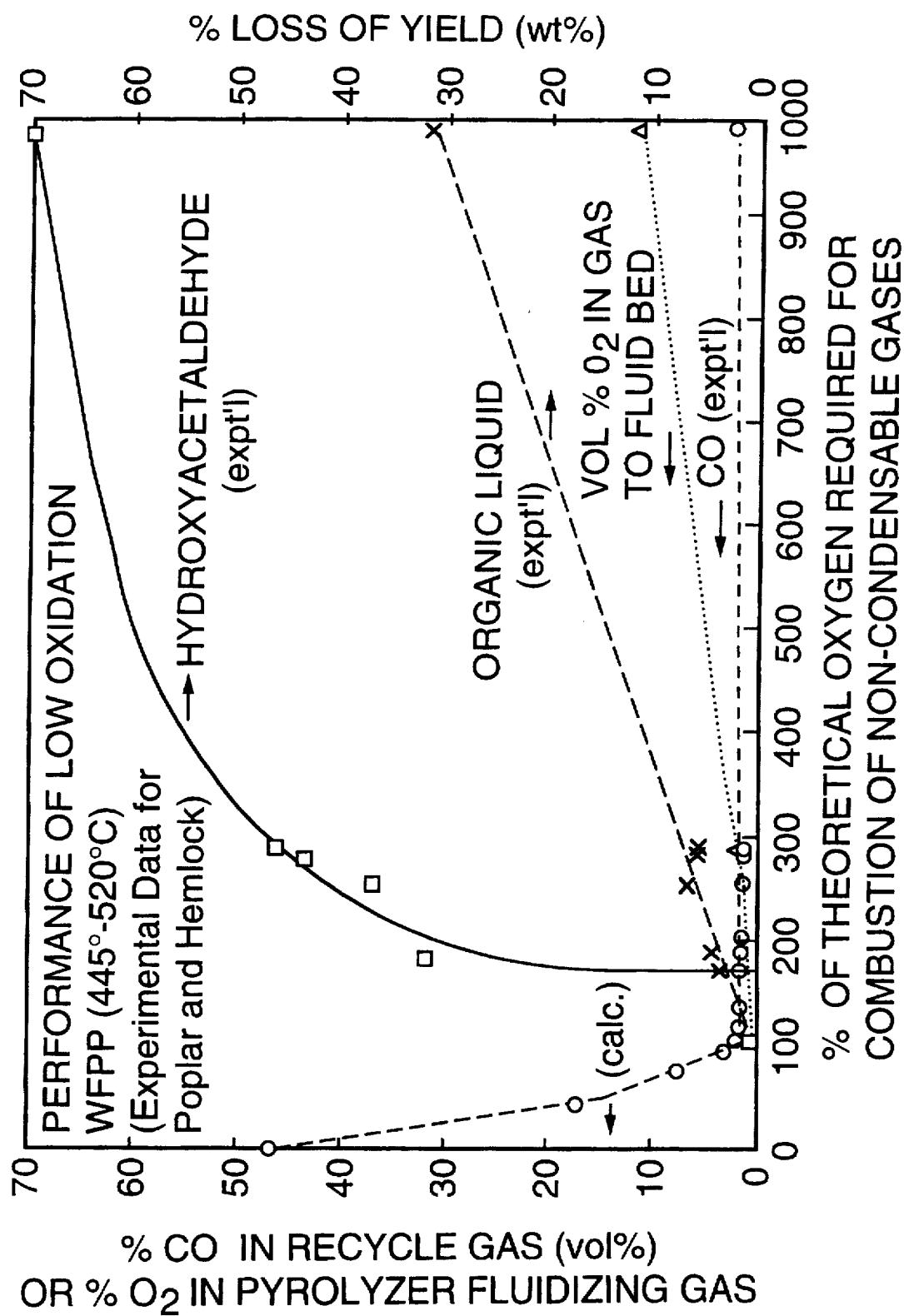
FIG. 2 is a graphical representation of the performance of the process of the present invention. It is apparent from this graph that the carbon monoxide content of the recycle gas can be reduced to a low level by the use of carefully controlled amounts of oxygen, conveniently added as air, coupled with an efficient oxidation unit capable of oxidizing low concentrations of the combustible gases. Yields of the important products, such as organic liquid, or of valuable components of the liquid, such as hydroxyacetaldehyde, are not significantly affected unless more oxygen than necessary is used by a factor of about two. However, it is also apparent that some valuable but reactive components, such as the hydroxyacetaldehyde, suffer a very rapid loss in yield if oxygen above the amounts preferred in the practice of this invention are used. Conversely, it is also apparent from FIG. 2 that small deficiencies in the stoichiometric requirement of oxygen could be tolerated if some level of carbon monoxide concentration in the recycle gas is acceptable above the minimum obtainable by the practice of this invention in its preferred form. In this latter case, the pyrolyzer gas stream shown in FIG. 1 contains essentially zero oxygen content, and there would be no oxidation reaction occurring in the pyrolyzer. Process temperatures as shown in FIG. 1 would need to be adjusted to compensate for the reduction in energy released due to the lower extent of oxidation reactions. Other consequences of operation with deficiencies or excesses in the supply of stoichiometric oxygen will be apparent from FIG. 2.

The air is introduced into this recycle stream preferably in an amount constituting a small excess over the stoichiometric requirement. This is necessary if it is desired to ensure a minimum content of carbon monoxide in the recycle gas. If a deficiency of oxygen were used, then a build-up of carbon monoxide concentration would occur to a new and much higher steady-state value. These relationships are shown in FIG. 2, in which both predicted and experimental values are shown, from tests with both hardwoods and softwoods. The curves shown will be at a little higher values for lower gas/wood ratios, and at lower values for higher gas/wood ratios.

The recycle gas composition given above is comparable to the exhaust emission from a gasoline internal combustion engine. The preferred oxidation method of this invention, therefore, is by the use of a catalytic oxidation unit entirely comparable in function to those used on automobile exhausts. This technology is well developed, flexible and efficient. For example, platinum-based catalysts for oxidation of exhaust emissions are designed to function to give 98% or better oxidation of carbon monoxide and hydrocarbons at carbon monoxide concentrations of 1% to 3% and at hydrocarbon concentrations up to 2%. Temperatures above 500° C. are adequate for carbon monoxide oxidation, but higher temperatures are required for complete oxidation of hydrocarbon gases. These values are within the ranges shown for the recycle gas in FIG. 1. Therefore, the same technology as that applied to engine exhaust emissions can be equally well adapted to the purposes of this invention. If the emission gases contain little or no sulfur, as is the normal case from biomass-derived materials, then catalyst compositions other than platinum are also possibilities.

It is also possible to use a non-catalytic oxidation unit, either as a separate high temperature unit, or as a part of the preheating process. However, because of the low carbon monoxide, hydrocarbon and oxygen concentrations in the recycle gas, either the temperature must be high, for example, above 900° C., or the reaction time must be long, to achieve a high degree of oxidation. Therefore, because of the proven performance of catalytic oxidation units, and their lower operating temperatures, this method is the one preferred for this invention.

The catalytic oxidation step can best be carried out in a separate unit. The heat available from this oxidation increases the temperature of the recycle gas stream of the order of about 150° C. to about 250° C. The additional heat needed for the pyrolysis reaction is added indirectly through a conventional fired preheater. While it is theoretically possible to fire additional fuel and air directly into the recycle gas stream before or after the oxidation unit, this practice is generally not desirable because of the additional water introduced into the system which will be condensed out with the organic bio-oil, and degrade its heating value if it is to be used as a fuel, or make the recovery of chemicals more difficult. It is therefore the preferred embodiment of this invention to add the required additional process heat indirectly.

If any excess oxygen is introduced at the oxidation unit, it enters the reactor with the recycle gas and reacts there with the biomass or with the volatile products. Our tests with this dilute oxidizing system have shown that the carbon oxidized in the reactor by the excess oxygen appears approximately as 20% carbon monoxide and 80% carbon dioxide, so that it contributes only in a minor way to the carbon monoxide content of the recycle gas. This is also a unique feature of the present invention. The heat generated by this oxidation, which generally consumes less than about 5% of the biomass fed, contributes to reducing the indirect heat that must be added to the conveying or fluidizing gas stream, and represents an efficient heat source. The process as described above is readily controlled by careful adjustment of the oxygen content of the gas entering the reactor. It is also of interest that in some tests with a non-oxidizing atmosphere in which a gas with a high content of carbon monoxide was introduced into the pyrolysis reactor, gaseous iron and nickel carbonyls were detected. These highly toxic compounds could appear in the product liquid. However, in the present invention, the concentration of carbon monoxide is too low in the recycle gas to form detectable amounts of these carbonyls.

The preferred level of oxygen entering the pyrolysis reactor in this invention is from 0% to about 2.0%, with a favorable range of about 0.2% to about 0.5%, by volume. At this level of oxygen, only minor changes in the compositions and yields given for the 0.0% oxygen case are to be expected.

EXAMPLES

Example 1

Western hemlock sawdust was pyrolyzed at three levels of oxygen content in the fluidizing gas entering a fluidized bed reactor containing sand as an inert heat carrier solid. The results obtained are shown in Table 1 below.

TABLE 1

Pyrolysis of Western Hemlock Sawdust
Particle size –0.5 mm, Moisture 5%

| Atmosphere | nitrogen/ air | nitrogen/ air | nitrogen |
|---|---|---|---|
| Temperature °C. | 455 | 445 | 460 |
| % Oxygen in gas | 12 | 1.6 | 0.0 |
| Oxygen/wood ratio (wt) | 1.8 | 0.3 | 0.0 |
| Gas, % of dry feed | 67.98 | 17.87 | 9.77 |
| Water, % of dry feed | 27.48 | 17.35 | 11.78 |
| Organic liquid | 32.32 | 45.13 | 47.46 |
| Char | 12.65 | 23.92 | 24.36 |
| Total recovery | 140.43 | 104.27 | 93.37 |
| Carbon monoxide, wt % feed | 14.15 | 4.73 | 3.18 |
| Carbon dioxide | 52.77 | 12.94 | 6.01 |
| Methane | 0.27 | 0.16 | 0.17 |
| Other hydrocarbons, etc | 0.79 | 0.04 | 0.41 |
| Hydroxyacetaldehyde (wt % of dry feed) | 2.10 | 4.35 | 8.01 |
| Formic acid | 3.13 | 2.79 | 2.62 |
| Acetic acid | 0.68 | 0.88 | 0.99 |

It is apparent from a comparison of the results of the three experiments presented in Table 1 that the yield of organic liquid decreased and the water produced increased as the oxygen content of the gas entering the pyrolyzer increased. At an oxygen content of 1.6% by volume in the gas (representing the excess oxygen supplied over the stoichiometric requirement for complete oxidation of the combustible components of the recycle gas), the overall liquid yield was not decreased although the organic content is a little lower and the water content considerably higher at these conditions. However, the liquid obtained may still probably serve as a low quality alternative fuel oil. The yield of a valuable component of the liquid, hydroxyacetaldehyde, was reduced, however, to only about one half of that obtained when there is no oxygen entering the fluid bed pyrolyser, that is, when the stoichiometric amount (or a little less than a stoichiometric amount) of oxygen is added to the recycle gas before the oxidation step. At a high oxygen level of 12% in the gas entering the pyrolyzer, organic liquid yield was considerably reduced and the water content of the liquid product was too high for use as a fuel oil. Also, the yield of hydroxyacetaldehyde was reduced to only 26% of that obtained with zero or low oxygen content. Additional analysis of the liquid components (not shown) indicates that the composition of the organic liquid fraction also changes significantly with respect to other components of the liquid as the degree of oxidation increases and this may result in a degraded liquid product for many potential uses.

Example 2

A series of tests was carried out on a hardwood sawdust (poplar) at 489° C. to 504° C. and with a small excess oxygen additions over that required for stoichiometric oxidation of the non-condensable combustible components of the recycle gas stream. The results of these tests are shown in Table 2 below, and cover a range of 0% to about 200% excess oxygen (that is, 100% to 300% of the stoichiometric oxygen requirement). Tests were carried out in a continuous bench scale fluidized sand bed operating at essentially atmospheric pressure. It is apparent from the results contained in this Table 2 that even with the higher excess oxygen amounts, the reduction of organic liquid yield was small, about 5%. However, the water content increased somewhat, and the yield of a key valuable organic component, hydroxyacetaldehyde, was significantly reduced at the higher oxygen levels, but not at the lower ones.

TABLE 2

Pyrolysis of Poplar Sawdust
Particle size −0.5 mm, Moisture 5, 5%, 0, 5 sec residence-time

| Atmosphere | nitrogen | nitrogen/air | | | |
|---|---|---|---|---|---|
| Temperature, °C. | 504 | 490 | 491 | 489 | 493 |
| % oxygen in inlet gas | 0.00 | 0.25 | 0.35 | 0.56 | 0.83 |
| Oxygen/wood, wt. ratio | 0.00 | 0.033 | 0.042 | 0.075 | 0.089 |
| Gas, % of dry feed wt. | 10.4 | 16.4 | 16.0 | 20.8 | 21.8 |
| Water (product) | 14.1 | 8.7 | 11.8 | 9.9 | 15.2 |
| Organic liquid | 60.7 | 59.0 | 58.6 | 57.2 | 57.5 |
| Char | 11.1 | 10.7 | 10.4 | 10.2 | 9.9 |
| Total Recovery | 96.3 | 94.8 | 96.8 | 98.1 | 104.5 |
| Carbon monoxide, % feed | 3.34 | 4.75 | 4.15 | 5.13 | 4.13 |
| Carbon dioxide | 5.51 | 9.92 | 10.38 | 13.87 | 15.49 |
| Methane | 0.25 | 0.29 | 0.29 | 0.31 | 0.31 |
| Other hydrocarbons | 1.30 | 1.46 | 1.15 | 1.53 | 1.85 |

TABLE 2-continued

Pyrolysis of Poplar Sawdust
Particle size −0.5 mm, Moisture 5, 5%, 0, 5 sec residence-time

| Atmosphere | nitrogen | nitrogen/air | | | |
|---|---|---|---|---|---|
| Hydroxyacetaldehyde (wt. % dry feed) | 7.93 | 8.04 | 5.43 | 5.00 | 4.48 |
| Formic acid | 2.38 | 2.19 | 2.00 | 2.38 | 1.95 |
| Acetic acid | 2.09 | 1.86 | 1.67 | 1.92 | 1.78 |

The results shown in Table 2, together with those given in Table 1, show that a small excess of oxygen over that required for combustion of carbon monoxide, methane, and other gases in the recycle stream, is not detrimental to yields of the desired products. However, the addition of the oxygen must be carefully controlled to prevent loss of yield and degradation of the liquid product by excessive oxidation. A small excess of oxygen over that required stoichiometrically for gas combustion would help to ensure high efficiency in the oxidation unit. However, as shown in FIG. 2 and in Tables 1 and 2, the ideal case is to use just the exact amount of oxygen required, that is, the stoichiometric amount, so that the oxygen content of the gas from the oxidation unit to the pyrolyzer equals or approaches 0%.

SUMMARY OF DISCLOSURE

In summary of this disclosure, the present invention provides a novel procedure for the thermal conversion of biomass to liquid products in which oxidation of combustible gases in a recycle stream is effected. Modifications are possible within the scope of this invention.

REFERENCES

1. J. Piskorz, D. Radlein and D. S. Scott, "On the Mechanism of the Rapid Pyrolysis of Cellulose" J.Anal. Applied Pyrolysis, 9, 121–137, (1986).
2. D. S. Scott, Canadian Patent No. 1,241,541 "Pyrolysis Process" September, 1988.
3. R. G. Graham, B. A. Freel and M. A. Bergougnou, "The Production of Pyrolyric Liquids, Gas and Char from Wood and Cellulose by Fast Pyrolysis" in "Research in Thermochemical Biomass Conversion" A. V. Bridgwater and J. L. Kuester (Eds.), Elsevier Applied Science Publ. (London) (1988) pp 629–641.
4. Gary Underwood and Robert G. Graham, U.S. Pat. No. 4,876,108 "Method of Using Fast Pyrolysis Liquids as Liquid Smoke", Oct. 24, 1989, also U.S. Pat. No. 4,994,297, Feb. 19, 1991.
5. BIO-ALTERNATIVE SA—Recycling forest and agricultural waste products—a Swiss technology for recuperating biomass energy Neuchatel/Switzerland, March 1989/1.

What we claim is:
1. A process for the thermal conversion of biomass or biomass derived substances to high yields of liquid products employing a short-residence time reaction, the process comprising the steps of:
 a) adding to a stream of recycle process gas to be used for conveying or fluidization in a short-residence time pyrolysis reactor sufficient oxygen-containing gas to give an excess of oxygen of 0% to about 200% of that required for combustion of combustible gas compo- nents to form an oxygen-containing gas-recycle gas mixture, b) passing the oxygen-containing gas-recycle gas mixture through a catalytic converter, with preheating if necessary, to oxidize combustible gas components in the recycle gas mixture, c) preheating the oxidized recycle gas together with any excess oxygen to a sufficiently high temperature to supply the required heat to a pyrolysis reaction, d) subjecting a biomass feed, after grinding and drying the particles to less than about 10% moisture, to short-residence time pyrolysis in the presence of 0 to about 2% by volume of oxygen at temperatures of from about 400° C. to about 650° C., gas plus volatiles residence times less than about 2 seconds, and at pressures substantially atmospheric to form a product gas, e) condensing from the product gases an organic liquid product together with water after removal of char or unreacted or inert solids to provide said recycle process gas, and, f) recycling said recycle process gas to step (a).

2. The process according to claim 1, wherein said amount of oxygen containing gas added to said recycle process gas is from about 10 to about 100% excess.

3. The process according to claim 1, wherein said amount of oxygen containing gas added to said recycle process gas results in an oxygen concentration in said pyrolysis reaction of about 0.2 to about 0.5% by volume.

4. The process according to claim 1, wherein the short residence-time pyrolysis is effected in a fluidized bed of inert solids.

5. The process according to claim 1, wherein the short residence-time pyrolysis is effected in a circulating fluidized bed of inert solids.

6. The process according to claim 1, wherein the short residence-time pyrolysis is effected in a transport reactor in which biomass is conveyed together with gas or gas/solid mixtures in any of an upflow, downflow or cyclonic mode.

7. A process according to claim 1, wherein the amount of added oxygen is sufficient to oxidize substantially the majority of the non-condensible combustible gases in the recycle gas stream before it enters the pyrolysis reactor, but which results in essentially a zero oxygen content in the gas entering the pyrolyzer, so that pyrolysis occurs under non-oxidizing conditions.

8. The process according to claim 1, 2, 3, 4, 5, 6 or 7, wherein the liquid condensate product is used as an alternative fuel oil.

9. The process according to claim 1, 2, 3, 4, 5, 6 or 7, wherein the liquid condensate product is used as a source of hydroxyacetaldehyde.

* * * * *